Dec. 8, 1959  D. D. STOLTMAN  2,916,269
COMBINED INJECTION AND PRESSURE CARBURETOR FUEL SYSTEM
Filed March 26, 1958
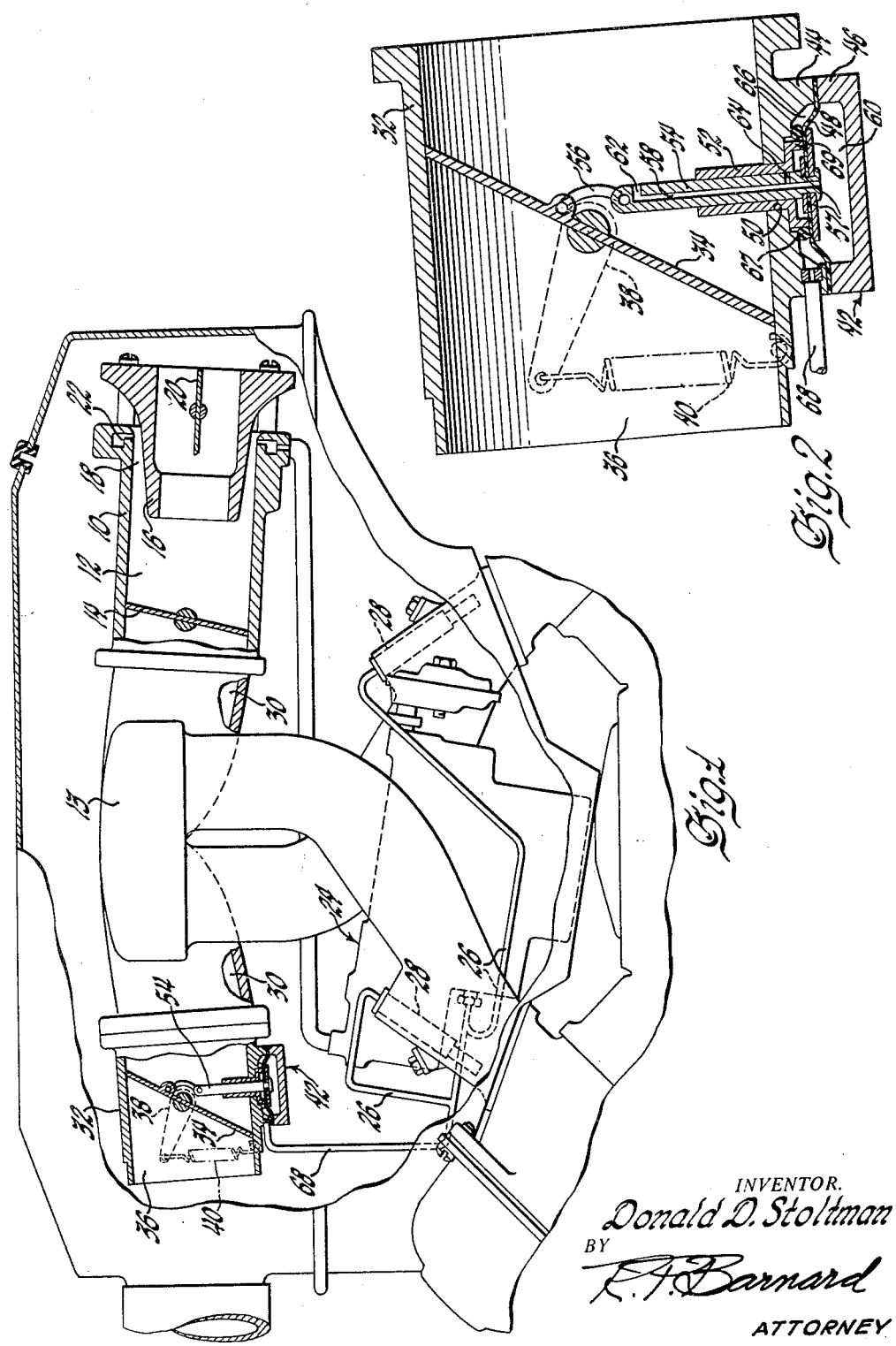
INVENTOR.
*Donald D. Stoltman*
BY
*R. F. Barnard*
ATTORNEY

United States Patent Office 2,916,269
Patented Dec. 8, 1959

2,916,269

COMBINED INJECTION AND PRESSURE CARBURETOR FUEL SYSTEM

Donald D. Stoltman, Rochester, N.Y., assignor to General Motors Corporation, Detroit, Mich., a corporation of Delaware Application March 26, 1958, Serial No. 724,166

10 Claims. (Cl. 261—23)

The present invention relates to a combined injection and carbureted fuel system in which the advantages of both are combined to provide a more satisfactory means of supplying a combustible mixture to an engine.

In a mass air flow type fuel injection system, i.e. where the quantity of fuel supplied varies directly with air flow, the problem arises of providing an air flow-measuring venturi which is small enough to provide a reasonably strong metering signal under low air flow conditions and yet which is large enough not to restrict the flow of air under high air flow conditions. Various devices have been developed to accommodate the two conflicting requirements as to venturi construction. The simplest way of accommodating the two requirements is to compromise the venturi size between the extremes as a result of which it is not completely desirable under either high or low air flow conditions.

Other devices have been employed in solution of this problem and which include the use of a plurality of venturis connected in parallel so that during low air flow conditions a small venturi is used but under high air flow conditions a larger venturi is combined therewith to provide the requisite air flow.

In the present device it is proposed to utilize a well known type fuel injection system such as that shown in Serial No. 608,853 Dolza (Patent No. 2,843,098 granted July 15, 1958) but in which the venturi is made sufficiently small to insure a strong metering signal under low air flow conditions. However, in the present system, a pressure carburetor device is combined in parallel with the fuel injection mechanism so as to be opened under high air flow demand conditions to provide additional air and fuel flow. Thus, the system may function as a fuel injection system or as a combined injection carburetor system depending on engine demand.

The carbureting mechanism in general includes a separate air intake passage which communicates with a common plenum chamber also fed by the fuel injection air intake. A valve whose actuation is responsive to injection nozzle pressure is disposed in the carburetor air intake passage and is combined with what may be termed a secondary nozzle orifice in such a way that as the aforenoted nozzle pressure exceeds a given value the carburetor valve will be fully opened to supply additional air and fuel to the cylinder intake passages and in this way supplement the charge being supplied by the injection system.

The advantages of the aforenoted combination is to further increase the air flow to the engine under high demand conditions. Thus, since the injection system is required to supply fuel mainly under low air flow conditions a considerable reduction is realized in the maximum fuel pressure required by the injection system as a result of which a lower quality less expensive fuel pump may be utilized.

Other objects and advantages of the present invention may be realized from a perusal of the detailed description which follows.

In the drawings:

Figure 1 illustrates an engine embodying the subject fuel system; and

Figure 2 is an enlarged view of the carburetor portion of the fuel system.

The fuel injection system, as already noted, is basically the same as that shown in the aforenoted Dolza application. Therefore, the injection system will be described only insofar as is necessary to an understanding of its function in relation to the carbureted portion of the overall system.

The fuel injection system includes a casing 10 having an air intake passage 12 leading to plenum chamber 13. The air flow through passage 12 is controlled by a throttle 14. A suitably contoured diffuser 16 is disposed in intake passage 12 and cooperates therewith to define an annular venturi 18. If desired diffuser 16 may include a signal modifier valve 20, as shown and described in copending application Serial No. 711,994 Sagady, filed January 29, 1958. An annular vacuum chamber 22 is formed in casing 10 and communicates at its radially inner end with the throat of venturi 18.

A fuel metering mechanism is shown generally at 24 and for the purposes of the present invention it will suffice to note that the metering mechanism receives a vacuum signal from venturi chamber 22 which is proportional to the square of air flow. Accordingly, mechanism 24 meters fuel in proportion to said air flow to conduits 26. Conduits 26 terminate in nozzles 28 disposed in individual cylinder intake passages 30.

As already suggested, in the present system it is intended that the injection system alone supplies fuel under low air flow conditions. Accordingly, venturi 18 may be considerably smaller than has been used in the past as a result of which the air flow velocity through the venturi is maintained at a relatively high value producing a strong metering signal in the vacuum chamber 22. By the same token smaller nozzle orifices may be used to raise the lowest fuel pressure thus assuring better fuel metering, metering response and suppression of vapor formation.

The carbureted portion of the subject system includes a separate air intake casing 32 suitably connected to the common plenum chamber 13. A throttle or flow control valve 34 is disposed in passage 36 of casing 32. Throttle valve 34 includes an arm 38 fixed thereto and which has one end of a spring 40 connected thereto. The other end of the spring is suitably fastened to intake casing 32 so as to normally bias throttle 34 in a closed direction.

Under low air flow conditions the throttle will be maintained in the closed position as shown. In order to open the secondary or carburetor throttle 34, a servo mechanism 42 is operatively connected thereto. The servo mechanism includes a first casing portion 44 integrally formed with or suitably mounted on the carburetor intake casing 32. A second casing or cover 46 is mounted on the first casing 44 so as to peripherally clamp therebetween a flexible diaphragm member 48. An opening 50 is provided through intake casing 32 and within which opening a fixed sleeve 52 is supported.

A stem 54 is slidably mounted in sleeve 52 and centrally fixed to diaphragm 48 through a pair of reinforcing washers 57. Stem 54 is articulated to secondary or carburetor throttle 34 through a link 56. An axial passage 58 is formed through stem 54 and communicates at one end with a chamber 60 defined by diaphragm 48 and casing 46. The other end of passage 58 terminates in a portion 62 facing downstream relative to the air flow through induction passage 36.

A radial passage 64 is formed in stem 54 proximate the diaphragm end thereof. When the secondary throttle valve 34 is closed radial passage 64 is blocked by fixed sleeve 52 as shown in Figure 2. When, on the other hand, secondary throttle 34 is opened, radial passage 64 communicates with a chamber 66 defined by diaphragm 48 and casing 44.

An O-ring type seal 67 is disposed about the enlarged end 69 of fixed sleeve 52 which projects within fuel chamber 66. Seal 67 seats at its upper end against casing 44 and its lower end is adapted to project slightly below end 69 of sleeve 52 so as to be engaged by diaphragm 48 when the secondary throttle is closed. Seal 67 and enlarged end 69 of sleeve 52 cause a large portion of the area of diaphragm not to be exposed to the fuel pressure in chamber 66 when the throttle is closed. On the other hand, when throttle 34 begins to open a greatly increased diaphragm area is exposed to fuel pressure in chamber 66.

Fuel is adapted to be supplied to chamber 66 from a conduit 68 leading from the fuel metering mechanism supplied conduit 26. Fuel in conduit 26 is under the same pressure as that extant at injection nozzles 28. Under low air flow conditions, the force of spring 40 will exceed the force of the fuel pressure in chamber 66 acting on the then effective, and reduced, area of the diaphragm 48 to maintain the valve in a closed position.

As the nozzle fuel pressure exceeds a predetermined value, e.g. 75 p.s.i., the fuel acting on diaphragm 48 will be sufficient to commence opening of the secondary throttle 34 against the force of spring 40. As soon as the secondary throttle 34 begins to open, the additional area of diaphragm 48 beneath the enlarged portion 69 of sleeve 52 is exposed to the pressure in chamber 66 causing the valve to be snapped to a fully opened position. Thus, there is no modulation of the carburetor throttle which is either fully closed or fully opened. Upon the opening of the carburetor throttle, radial passage 64 will be communicated with chamber 66 and fuel will be supplied to axial passage 58 where it will be inducted into the air stream and be mixed therewith and carried through the plenum chamber 13 and intake passages 30 to the engine's cylinders.

Unless means was provided for compensating therefor, the sudden opening of the secondary or carburetor throttle 34 would cause supplemental air to be supplied to the cylinders before fuel flow through passage 58 could begin which would result in a temporary leaning of the charge to a point which might cause a momentary fall-off or loss of power. This eventuality is precluded by providing means for supplying a quick charge of fuel through fuel passage 58 when the secondary throttle is first opened. To this end, it will be noted that fuel will always be found in chamber 60 due to the latter's open communication with fuel passage 58. Thus, at the time diaphragm 48 is suddenly moved downwardly to open throttle 34, fuel within chamber 60 will be forced to flow up through passage 58 and into the carburetor induction passage to provide an initial flow of fuel to compensate for the increased supply of air which accompanies the throttle opening. After the initial opening of throttle 34 the fuel will be supplied from conduit 68 through chamber 66 to fuel passage 58 for normal fuel flow operation.

Another important feature of the differential area construction and operation of diaphragm 48, supra, is to incorporate a hysteresis or delayed actuation effect into the actuation of throttle valve 34. In other words, while a given nozzle pressure is required to open the carburetor throttle, once that throttle is opened a lesser nozzle pressure will be able to maintain the throttle in an open position due to the greater exposed diaphragm area. This actuation insures that valve 34 will open and close at different pressures thus preventing the valve hunting between opened and closed positions during minor variations in nozzle pressure.

While not limited to such values and by way of illustration of the differential operation of throttle 34, it is possible that seventy-five percent of the effective diaphragm area is exposed to the fuel under pressure in chamber 66 when throttle 34 is closed. On the other hand, with the throttle open one hundred percent of the effective area of the diaphragm is exposed to fuel pressure. As a result a reduction of twenty-five percent in the fuel pressure, or from the previous example of 75 p.s.i. to approximately 56 p.s.i., in chamber 66 will take place before spring 40 can again close throttle 34. In this way it is seen that a substantial reduction in nozzle pressure, reflecting engine power demand, must occur to cause throttle 34 to be closed in contrast to the pressure required to open the throttle.

It is apparent that structural modifications may be made in the subject system within the intended scope of the invention as hereinbefore described.

I claim:

1. A charge forming device for an internal combustion engine comprising a pair of air intake passages, throttle valves in each of said passages, a common air plenum chamber supplied by said intake passages, a plurality of individual intake passages communicating said plenum chamber with the cylinders of the engine, fuel nozzles formed in each of said cylinder intake passages, means for metering the quantity of fuel supplied to said nozzles in accordance with the mass of air flow through one of said air intake passages, means normally biasing the throttle valve in said other air intake passage in a closed position, means for opening said latter throttle when the nozzle fuel pressure exceeds a given value, and fuel supply means associated with said latter throttle for supplying fuel to the associated air intake passage when said latter throttle is open.

2. A charge forming device for an internal combustion engine comprising a pair of air intake passages, throttle valves in each of said passages, a common air plenum chamber supplied by said intake passages, a plurality of individual intake passages communicating said plenum chamber with the individual cylinders of the engine, fuel nozzles formed in each of said cylinder intake passages, means for metering fuel to said nozzles, means normally biasing the throttle valve in one of said air intake passages in a closed position during conditions of low engine power demand, means for opening said latter throttle in response to predetermined engine power demand, and fuel supply means associated with said latter throttle for supplying fuel to the associated air intake passage when said latter throttle is open.

3. A charge forming device as set forth in claim 2 in which said latter throttle opening means is adapted to maintain said throttle only in a fully closed or fully opened position.

4. A charge forming device as set forth in claim 2 in which said fuel supply means includes means for supplying a supplemental fuel charge when said latter throttle is first opened.

5. A charge forming device as set forth in claim 3 in which said latter throttle opening means includes means for opening said throttle when engine power demand exceeds a given value and for maintaining said throttle open until engine power demand is reduced to a value substantially below said given value.

6. A charge forming device for an internal combustion engine comprising air intake passage means, first and second throttle valves associated with said means, a plurality of individual intake passages communicating said air intake passage means with the individual cylinders of the engine, fuel nozzles formed in each of said cylinder intake passages, means for metering fuel to said nozzles, said first throttle being continuously operative to control air flow through the air intake passage means, means normally biasing the second throttle valve in a closed position during conditions of low engine power demand, means for opening said second throttle in response to predetermined engine power demand, and fuel supply means associated with said second throttle for supplying fuel to said air intake passage means when said latter throttle is open.

7. A charge forming device as set forth in claim 6 in which the second throttle opening means comprises a servo device including a sleeve fixedly disposed in said intake passage means, a stem slidably supported in said sleeve and having one end terminating within said passage means proximate said second throttle, said stem being articulated to said second throttle for movement therewith, a diaphragm centrally fixed to the other end of said stem, a casing peripherally supporting said diaphragm and forming a pair of chambers therewith, a passage formed longitudinally of said stem and communicating at its respective ends with the intake passage means and one of said chambers, conduit means communicating the nozzle fuel metering means with the other chamber, and a radial passage communicating said other chamber with the longitudinal stem passage, fuel flow through said radial passage being blocked by said sleeve when the second throttle is closed, nozzle fuel pressure in said second chamber being adapted to act on the diaphragm to open said second throttle and supply fuel through the radial and longitudinal passages to the air intake passage means.

8. A charge forming device as set forth in claim 7 in which said sleeve and diaphragm coact to reduce the effective area of said diaphragm when the second throttle is closed.

9. A charge forming device as set forth in claim 6 in which said second throttle opening means comprises a servo mechanism operable in response to a predetermined nozzle fuel pressure to open the second throttle.

10. A charge forming device as set forth in claim 9 in which the servo mechanism includes a differential area device causing said second throttle to be opened at a given nozzle pressure and closed at a substantially lower nozzle pressure.

References Cited in the file of this patent

UNITED STATES PATENTS

| | | |
|---|---|---|
| 2,382,625 | Garretson | Aug. 14, 1945 |
| 2,793,843 | Carlson | Mar. 8, 1957 |
| 2,823,020 | Smith | Feb. 11, 1958 |